(12) United States Patent
Massoudi et al.

(10) Patent No.: US 11,175,934 B2
(45) Date of Patent: Nov. 16, 2021

(54) METHOD OF DEFINING AND PERFORMING DYNAMIC USER-COMPUTER INTERACTION, COMPUTER GUIDED NAVIGATION, AND APPLICATION INTEGRATION FOR ANY PROCEDURE, INSTRUCTIONS, INSTRUCTIONAL MANUAL, OR FILLABLE FORM

(71) Applicant: NextAxiom Technology, Inc., San Francisco, CA (US)

(72) Inventors: Arash Massoudi, San Francisco, CA (US); Sandra Irene Zylka, Auburn, CA (US)

(73) Assignee: NEXTAXIOM TECHNOLOGY, INC., San Francisco, CA (US)

( * ) Notice: Subject to any disclaimer, the term of this patent is extended or adjusted under 35 U.S.C. 154(b) by 75 days.

(21) Appl. No.: 16/353,895

(22) Filed: Mar. 14, 2019

(65) Prior Publication Data
US 2019/0361721 A1    Nov. 28, 2019

Related U.S. Application Data

(60) Provisional application No. 62/676,197, filed on May 24, 2018.

(51) Int. Cl.
| | |
|---|---|
| *G06F 9/451* | (2018.01) |
| *G06F 16/93* | (2019.01) |
| *G06F 3/0482* | (2013.01) |
| *G06F 16/907* | (2019.01) |
| *H04L 9/32* | (2006.01) |

(52) U.S. Cl.
CPC ............ *G06F 9/453* (2018.02); *G06F 3/0482* (2013.01); *G06F 16/907* (2019.01); *G06F 16/93* (2019.01); *H04L 9/32* (2013.01)

(58) Field of Classification Search
CPC ........ G06F 9/453; G06F 16/93; G06F 16/907; G06F 3/0482; G06F 3/04895; G06F 3/0481; G06F 9/451; H04L 9/32; H04L 2209/60; H04L 9/3247
See application file for complete search history.

(56) References Cited

U.S. PATENT DOCUMENTS

| | | | |
|---|---|---|---|
| 10,552,525 B1 * | 2/2020 | Allison | ................. G06Q 10/10 |
| 2003/0058277 A1 * | 3/2003 | Bowman-Amuah | ........................ G06F 16/289 715/765 |
| 2004/0019611 A1 * | 1/2004 | Pearse | ................. G06F 16/9566 |

(Continued)

*Primary Examiner* — Jennifer N Welch
*Assistant Examiner* — Parmanand D Patel
(74) *Attorney, Agent, or Firm* — Workman Nydegger

(57) ABSTRACT

Various embodiments described in this disclosure relate to methods and computer-based systems that implement those methods for overlaying or superimposing computer-user interaction widgets and application interface widgets on top of content blocks contained within digitized documents which represent written procedures or instructions, instructional manuals and fillable forms, in order to support means of providing dynamic user-computer interaction and computer guided navigation, as well as application functions and data integration, driven through structured interaction and integration metadata definitions, as it relates to said content blocks, during job performance.

19 Claims, 7 Drawing Sheets

(56) References Cited

U.S. PATENT DOCUMENTS

| | | | |
|---|---|---|---|
| 2008/0301552 A1* | 12/2008 | Bartek | G06F 9/453 |
| | | | 715/700 |
| 2012/0063684 A1* | 3/2012 | Denoue | G06K 9/2072 |
| | | | 382/175 |
| 2013/0346919 A1* | 12/2013 | Adderton | G06F 16/335 |
| | | | 715/835 |
| 2016/0155273 A1* | 6/2016 | Lyren | G02B 27/0093 |
| | | | 345/633 |
| 2018/0018069 A1* | 1/2018 | Migos | G06F 3/0483 |
| 2018/0018613 A1* | 1/2018 | Richardson | H04W 4/02 |

* cited by examiner

*r* 702

```
41HT-PM-001, 1A Heater Treater Pump Seal Inspection    Revision 4
                                          Interaction Performance Tool
  ▽    6.0   INSTRUCTIONS ▽   6.1   Accessing the Seal           Steps that have been
                                           performed are indicated &
         1. Don fall protection gear.      actions taken are marked        Completed 2. Ensure all tooling has installed lanyards.                     Completed 3. Is Pump cover installed?       No      Answer to question was 'No'; thus, IPT
                                                   navigated performer to steop 6.2.1

4. Remove Pump cover:
            a. Loosen the four cover guide bolts.
                                       CAUTION
            Cover collar has close tolerance to the pump shaft. Sliding the collar too quickly may
            gall or score the shaft.               Steps 6.1.4 & 6.1.5 were not performed
                                                   because answer to question 6.1.3 was 'No'.
            b: Slip cover collar vertically on pump shaft.  Steps were automatically marked N/A.
            c. Pull back cover.
                                                           N/A, pump cover not installed 5. If significant oxidation is noted inside pump cover, then initiate a work request to replace
            pump cover
                                                           N/A, pump cover not installed Computer guided navigation helps user keep place
    ▽   6.2   Inspecting the Seal          in structions: current step is indicated 1. Remove two seal boundary bolts.
                                                                         ( Mark Removed )

2. Using emory cloth, clean seal face.

( Add Signature )       ( Add Signature )
                                            Performer              Independent Verifier Pre-Instructions   Instructions   Post-Instructions   ◁ Views
```

*FIG. 7*

METHOD OF DEFINING AND PERFORMING DYNAMIC USER-COMPUTER INTERACTION, COMPUTER GUIDED NAVIGATION, AND APPLICATION INTEGRATION FOR ANY PROCEDURE, INSTRUCTIONS, INSTRUCTIONAL MANUAL, OR FILLABLE FORM

CROSS-REFERENCE TO RELATED APPLICATIONS

This application claims the benefit of and priority to U.S. Provisional Patent Application Ser. No. 62/676,197 filed on May 24, 2018 and entitled "Method of Defining and Performing Dynamic Human-Computer Interaction, Computer Guided Navigation, And Application Integration for Any Procedure, Instructions, Instructional Manual, or Fillable Form," which application is expressly incorporated herein by reference in its entirety.

BACKGROUND

Background and Relevant Art

Across any industry that requires a structured approach to job performance, many jobs performed by people are guided by written procedures and work instructions, which ensures reliable and consistent performance of tasks and minimizes the risk of user errors. Even instructional manuals for goods, requiring setup and maintenance, contain instructions that need to be followed by a person using such goods.

Both instructional manuals as well as written procedures/instructions direct the actions of a person performing the job in a defined sequence, while, optionally, providing other information and documents such as diagrams, drawings, illustrations, images, and fillable forms.

Instructional manuals, written procedures and work instructions are often presented to one who performs a job in the form of paper documents or an equivalent digitized document, such as a PDF, on a computer device.

In more mission-critical industries, such as Nuclear or Oil & Gas, field workers often carry a large stack of paper work packages, or an equivalent digitized set of documents on a computer device, to the job performance site just to complete a single work order. Often such procedures and instructions encompass multiple different scenarios and thus require complex navigation of documents, whether physical documents or electronic, to the applicable scenario by the field worker.

Field workers must often manually sift through volumes of information pertaining to irrelevant scenarios in order to navigate to the applicable steps, diagrams and instructions. Not only does this reduce the "wrench time", or the time spent actually performing the task on hand, but also may lead to unintentional user errors. Paper procedures and instructions or their equivalent digitized documents provided require manual and time consuming navigation to relevant information and the next step, computational support, placekeeping of instruction steps, verification of tools and equipment pertaining to the procedure/instructions, verified acknowledgment of Cautions and Notes within instructions or other content blocks, verified completion of signatures, and support for other aspects of job performance.

Furthermore, non-interactive written procedures/instructions only allow for job monitoring once the job is complete, and only based on an employee's report of the job.

There are various innovative approaches in defining and performing user-computer interaction and computer guided navigation when it comes to the performance of written procedures/instructions. However, any approach that requires fundamentally changing the way procedure/instructions are authored will suffer from significant change management costs and user adoption issues. For example, a typical nuclear utility invests tens of millions of dollars in the process of writing, reviewing, approving, and organizing tens of thousands of work instructions and procedures. In a nuclear utility, procedure writers currently use advanced, mature and full-featured text authoring tools such as Microsoft Word or Adobe FrameMaker to define procedures and work-instructions. Abruptly changing that with a new tool for authoring instructions as well as user-computer interaction is not only a colossal undertaking but also suffers from tremendous change management costs in using the new process and tools for procedure-writing. Besides the change management costs, such approaches pose a significant risk of adoption and user acceptance as currently procedure writers are accustomed to mature software for authoring instruction (without the interaction or application integration).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The scope of the present invention is not limited to any degree by the statements within this summary.

Various embodiments of the disclosure relate, generally, to computer implemented systems and methods to define user-computer interactions, computer guided navigation and application integration for digitized written procedures/instructions, instructional manuals and/or fillable forms (hereon referred to collectively or individually as the digitized document), in a structured metadata format containing the interaction and interface definitions together with the corresponding content blocks of the digitized document, and to perform the defined interactions and integrations guided through the structured metadata at job performance time. The computer guided interaction and application interface definitions may be defined through an interaction authoring tool (Interaction Authoring Tool—IAT) by overlaying or superimposing user-computer interaction widgets (heron referred to as interaction widgets) and application integration widgets (hereon referred to as interface widgets) over content blocks of the digitized document to encapsulate each content block through a corresponding widget and then configuring the interaction and interface properties of said widget including configuring its sequence of appearance statically or conditionally based on dynamic data, relative to other widgets, for computer-aided navigation at job performance time. The computer-guided interaction and application interface definitions (Interaction and Interface Definition Metadata—IIDM), together with content blocks encapsulated through the widgets, are stored in a persistent computer data store as structured XML, or functionally and sufficiently equivalent data structures. Based on some embodiments of the disclosure the IIDM may also be generated programmatically. At job performance time, computer guided interactions and application integration may be performed within an Interaction Performance Tool (IPT) driven by the interpretation of the IIDM.

Other embodiments of the disclosure relate, generally, to defining configuration driven interaction widgets which encapsulate content blocks from the digitized document with each widget supporting specific types of user-computer interactions, as it relates to its corresponding content block, and embedding select widgets within other widgets for more granular encapsulation and context sensitive interactions.

Yet other embodiments of the disclosure relate, generally, to methods for generating IIDM programmatically or through IAT, capturing and aggregating information about the dynamic user-computer interactions during job performance to provide job performance monitoring, statistics and analytics and supporting computer-guided navigation from the contents encapsulated within one widget to contents encapsulated within another through static sequencing of widgets or dynamically through the automatic evaluation of conditional statements based on dynamic data. Furthermore, to methods accommodating advanced computer guidance for job requirements such as repeated action steps and other advanced interactions through different types of superimposed/overlaid and linked interaction widgets.

Yet, other embodiments of the disclosure relate, generally, to methods of defining, and supporting at job performance time, the bidirectional integration of data and automatic dispatch of application functions from other applications to/from content blocks of an existing digital written procedure/instructions or fillable form, integrations which may be defined through the selection of software service interfaces with typed input/outputs such as standards-based Web Services (e.g., WSDL/SOAP or RESTful) that are automatically associated with a set of interface widgets that may be placed inside of any interaction or any widget encapsulating said content blocks (container widget). Furthermore, some embodiments of the disclosure relate, generally, to providing integrated methods through typed data interface widgets, to gather user inputs during job performance as it relates to the contents of one interaction widget and making such data referenceable by and available to other proceeding widgets to support dynamic computer-aided navigation and reduce user errors during job performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

The above, and other aspects, features, and advantages of several embodiments of the present disclosure will be more apparent to one of ordinary skill in the art from the following Detailed Description as presented in conjunction with the following several appended drawings, understanding that these drawings depict only typical embodiments and are not therefore to be considered to be limiting in scope, including:

FIG. 7 shows an example of an embodiment of the Interaction Performance Tool (IPT), performing user-computer interaction, computer-guided navigation and placekeeping based on the superimposed/overlaid interaction widgets and their configured attributes as partially shown/defined in FIG. 6.

Figure 1:
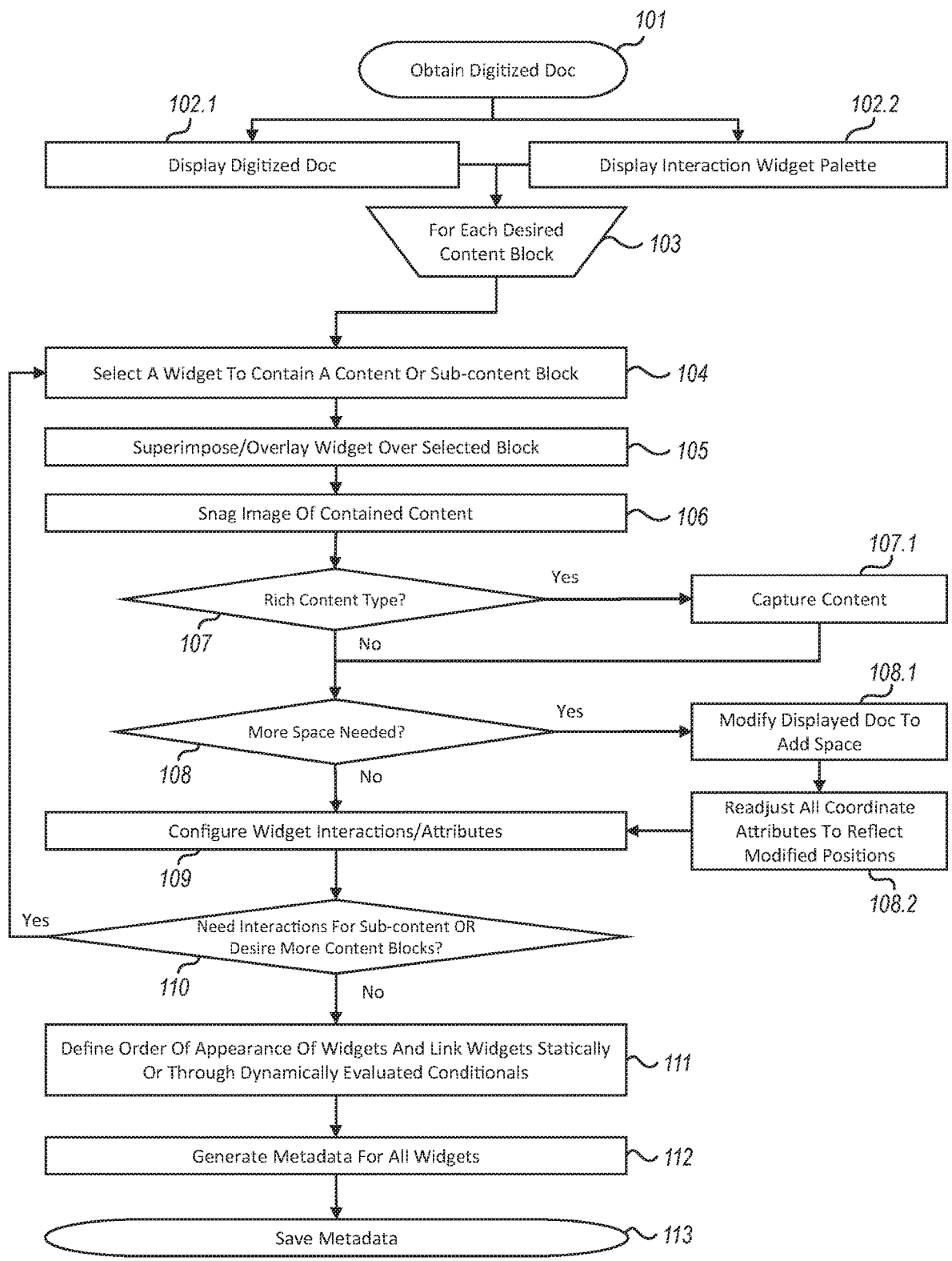
FIG. 1 shows a flowchart of an embodiment of a method to define user-computer interaction and computer-aided navigation through superimpose/overlay of interaction widgets on top of content blocks of any digitized written procedure/instructions, instructional manual and fillable forms, resulting in structured metadata definitions.

Elements in the several figures are illustrated for simplicity and clarity and have not necessarily been drawn to scale. Also, common, but well-understood elements that are useful or necessary in commercially feasible embodiments are often not depicted in order to facilitate a less obstructed view of these various embodiments of the present disclosure.

DETAILED DESCRIPTION

The efficiency of performing procedures/instructions may be significantly improved when dynamic information about the job, work environment or equipment/tools is presented, in a graphical user interface, to the person performing the job. Indeed, embodiments are able to provide information to a user that was not previously available. Some of this information resides in the core backend enterprise applications. Also, data entered during job performance, that may be captured using fillable forms or segments thereof, most often belong to the core backend enterprise applications such as Asset Management or Work Management systems. Furthermore, sometimes at job performance time, the ability to conveniently access a function of those backend applications while performing procedures/instructions, for example being able to create a work request through a Work Management system, may significantly improve job efficiency. Thus, embodiments implement an improved computing system that is able to display a standardized procedure/instruction manual or fillable form, while also providing interactive access with additional enterprise data while the user is interacting with the manual or form. Existing written procedures/instructions, instructional manuals or fillable forms, whether in paper form or as a digitized document do not provide such functionality. For example, existing computer systems providing such manuals and forms do not also include interactive instructions guiding a user through the form, nor do such systems provide access to additional enterprise data related to the form.

By separating concerns as it relates to instruction authoring vs interaction/interface authoring, applying a method of embodiments of this invention minimizes change management costs and results in a non-intrusive and incremental approach to adding computer guided interaction and application integration to the performance of existing, as well as new, written procedures/instructions without requiring any significant change to the established existing processes of an organization and, instead, by adding a layer of processes, and computer guided interaction, on top of what already exists.

The application of a method of embodiments of this invention provides a non-intrusive, practical and incremental approach and means to improve work efficiency and reduce user error through computer guided interaction for navigation to the relevant job scenario, information and steps, computational support, automatic placekeeping of instruction steps, verification of tools and equipment pertaining the procedure/instructions, verified acknowledgment of Cautions and Notes within procedures, and for other aspects of performing a job.

The following description is meant to enable one of ordinary skill in the art to practice the disclosed embodiments by the way of example and specific details of its key elements. The use of specific details, arrangement of components, specified features, examples or the like do not signify a preferred embodiment and are not intended to limit the scope of this invention to said details or examples. In addition, a subset of the components of this embodiment may be arranged by one of ordinary skill in the art in different configurations than specified and all drawings accompanying this disclosure are for illustrative purposes only. Therefore, one skilled in the relevant art will recognize, however, that the embodiments of the present disclosure can be practiced without one or more of the specific details, or with conventional methods used in the industry or other methods, components, and so forth.

In general, well-known structures and operations are not shown or described in detail to avoid obscuring aspects of the present disclosure. Other elements not described herein relate to various conventional methods, components and acts that one with ordinary skill in the art may incorporate in accord with the embodiment of this disclosure. For example, details concerning exception-handling, timing and other similar considerations have been omitted where such detail is not necessary for obtaining a complete understanding of this closure by one of ordinary skill in the art. Furthermore, any alterations and further modifications in the illustrated methods, and such further application of the principles of the invention as illustrated herein are contemplated as would normally occur with one skilled in the art incorporating the method of this invention.

As noted above, the following description is not to be taken in a limiting sense, but is made merely for the purpose of describing the general principles of exemplary embodiments. Many additional embodiments of this invention are possible. It is understood that no limitation of the scope of the invention is thereby intended. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment. Also, the phrases "at least one," "one or more," and "and/or" are open-ended expressions that are both conjunctive and disjunctive in operation.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, composition of components and so forth may be made, without departing from the spirit and scope of the present disclosure, as set forth in the appended claims, as may be apparent to those of ordinary skill in the art, are also encompassed by the present disclosure.

In one embodiment of the disclosure, generally, a digitized form of the written procedure/instructions, instructional manual and/or fillable forms, in PDF with a rich content format or any other electronic format, referred to as the digitized document, is imported into an Interaction Authoring Tool (IAT) as illustrated at step 101 of FIG. 1 and displayed as illustrated at step 102.1 in the background using a scrolled graphical user interface window on a display of a computing device. The IAT 402 also displays, in a separate window, a rich palette of configurable interaction widgets as illustrated at step 102.2 where each widget in the palette, generally or specifically, corresponds to a different content type within a typical digitized document. FIG. 1 shows a flowchart that depicts the simplified steps, in one embodiment of this disclosure, used to define user-computer interaction and computer-aided navigation through superimpose/overlay of interaction widgets over the content blocks of the digitized document. In FIG. 1, steps 104 and 105, the person defining the interactions (the interaction designer) superimposes (to show the content underneath) or overlays (to block the content underneath or portions thereof) a selected widget, from said palette, over (or on top of) a corresponding content block and resizes the widget to contain and snag the desired content block (depicted in FIG. 1, step 106).

For example, the interaction designer, may superimpose a Caution interaction widget, over the Caution content block of the underlying procedure/instructions, resize the widget to contain the written Caution section, then set the attributes of the widget such as job performance sequence designator (e.g., sequence number or other ordered designator), that this instance of Caution requires acknowledgment, where to place and what to label (with a label for pre-acknowledgment and another for post acknowledgment) the means of acknowledgment inside the widget, the display properties of the acknowledgment, so on so forth, to indicate an acknowledgement of the Caution section is required before the user may move to the next content block of the procedure/instructions at job performance time, and to set other properties available on the widget that may include look and feel properties. Similarly, the interaction designer may superimpose Step interaction widgets over each step of the procedure/instructions, set their display attributes, and sequence, through e.g., sequence attribute numbers, and link the steps widgets based on the order of performance, or conditionally, through binary questions, or more complex conditional statements, based on different job scenarios and thus provide automatic, dynamic, computer guided navigation of instructions within the Interaction Performance Tool (IPT) 702 (see FIG. 7) at job performance time.

Figure 4:
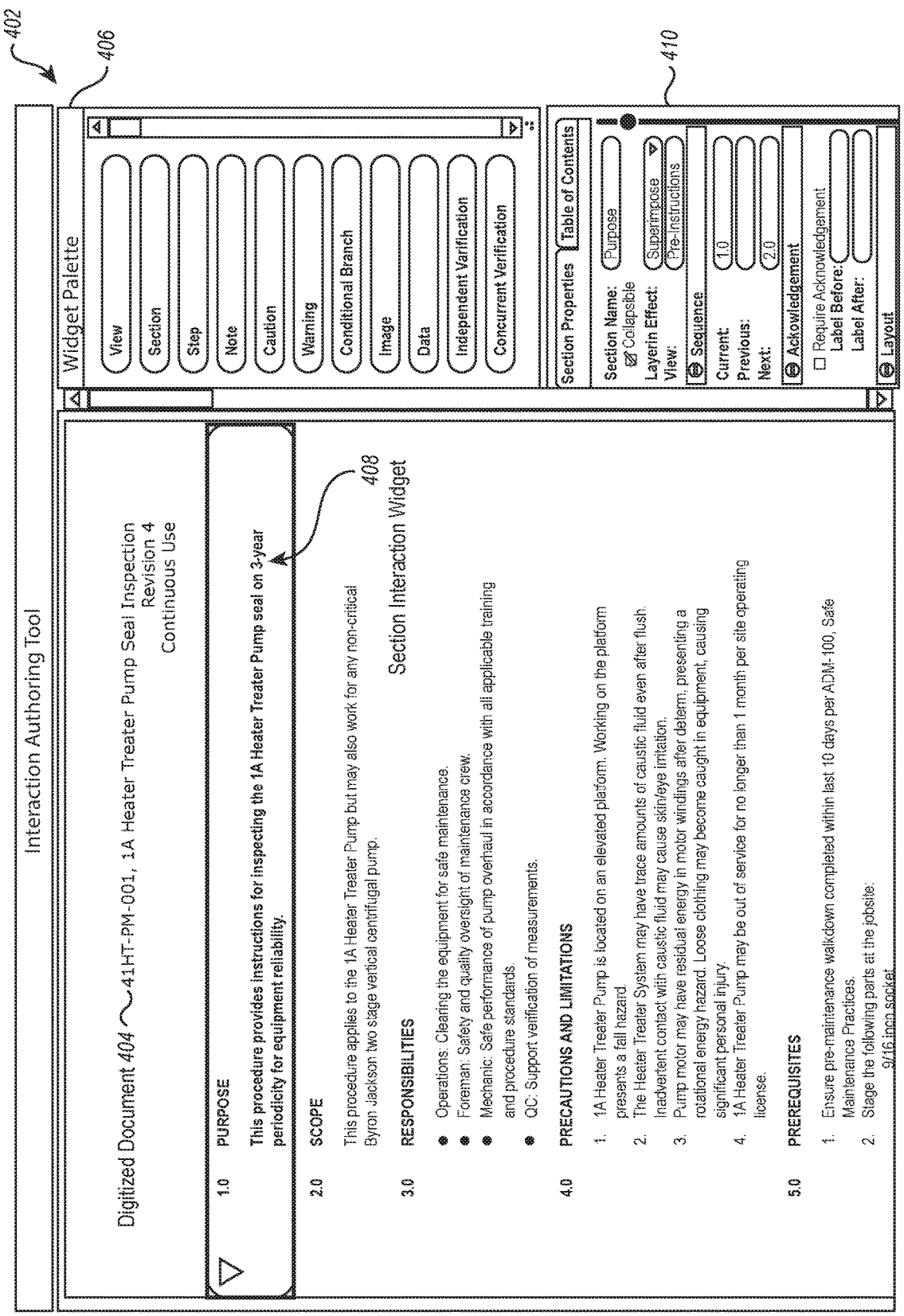
FIG. 4 shows an example of an embodiment of the Interaction Authoring Tool (IAT), displaying an example of the digitized document, and an example of an interaction widget palette, with a Section interaction widget, selected from the palette and, superimposed on the content block of the first section of the digitized document together with an example of some of the widget's properties and attributes.

FIG. 4 shows one embodiment of IAT 402, where an example of written procedure/instructions, used for the inspection of a heater treater pump, is displayed as the digitized document 404 in a scrolled window, with a widget palette 406 displayed in a separate window in the top, right portion of FIG. 4. In this example, an interaction designer had already selected a general-purpose Section widget 408 from the palette 406 and superimposed it over the first section of the digitized document 404, the section titled "Purpose", and had configured some of the properties/attributes of the selected widget, displayed in a window 410 which is located below the widget palette display in FIG. 4. For example, the selected Section widget 408 is configured to have a "Section Name" attribute with a value of "Purpose" and to be a "Collapsible" widget meaning that the widget may be displayed collapsed or expanded both within IAT 402, when defining interactions, and through IPT 702 (see FIG. 7), when interactions are being performed. The "Layering Effect" of the selected Section widget 408 is set to "Superimpose" so the widget 408 is superimposed (being transparent) over the "Purpose" section vs being overlaid (which would cover the content block under it). The selected Section widget's sequence number (under Sequence->Current) is set to "1.0", the previous widget's sequence number (Sequence->Previous) is not set since the selected widget is the first widget, and the sequence number of the next widget to be performed (Sequence->Next), at job performance time, is set to "2.0" (i.e. Sequence->Current+1) by default. The interaction designer may change the Sequence->Next attribute to point to a widget with a different sequence number or to use a conditional widget to dynamically determine the "Next" widget to automatically navigate to at job performance time, as will be described later. Furthermore, the selected widget is configured not to require an acknowledgement by the user of IPT 702 at job performance time, before the user may mark the widget as completed and proceed to the next widget containing the next content block to be considered/performed. The selected Section widget, as it may be the case with all interaction widgets, also snags the contents of the section or the content block contained within it as part of its metadata together with the value of its attributes as configured by the interaction designer. One with ordinary skill in the relevant art will acknowledge that considering the embodiments described in this disclosure, there are various different interaction attributes and IAT 402 designs that may be conceived utilizing conventional methods of implementation available in the industry.

As illustrated in FIG. 1, step 107, if the digitized document is of a rich content format, such as PDF, the IAT 402 also captures the content of the content block contained by the selected widget as illustrated at step 107.1. In FIG. 1, step 109, the interaction designer configures the relevant user-computer interaction provided by the widget to be dynamically enforced when the contained content block of the digitized document is being followed at job performance time.

As illustrated in FIG. 1, step 108, when a superimposed/overlaid widget needs to occupy a space that is larger than the space provided by the specific area of the displayed digitized document that is being contained by the widget, the displayed digitized document is modified, see steps 108.1 and 108.2, to add the required space and the modified version is displayed instead of the original. As an example, when a Caution widget is superimposed over a Caution section of a digitized document, requiring acknowledgment at job performance time, if there is no room between the Caution section and the next section to insert an acknowledgment button, a modified version of the digitized document, containing the required added space will be created and the modified version will replace the last displayed digitized document in the associated display. One way to accomplish the modification is to split the digitized document into two documents where the first document contains all the contents up to the end of said Caution section and the second document contains all the content of the digitized document after the Caution section and then to add the desired blank space to the end of the first document and merge back the first and the second document while readjusting all the coordinates of the widgets already superimposed/overlaid in locations of the second document to reflect the new coordinates resulting from the addition of the blank space and displaying the merged document instead of the last displayed digitized document.

Once the interaction designer has repeated the steps 104 through 110 of FIG. 1, for each desired content block or sub-content block (i.e. content within a content block already contained within an interface widget), repeating to contain all the desired content/sub-content blocks of the displayed digitized document, the interaction designer moves to step 111 to define the order of appearance/activation of the widgets at job performance time. One of the attributes in common across all widgets is the attribute that defines the order of appearance/activation across content types contained by the widgets, for example through a sequence number attribute, resulting in computer-guided navigation at job performance time. The order of appearance may be defined by statically linking/pointing one widget to another, for example by one widget referencing another widget's sequence number as its next widget to navigate to, or conditionally and based on dynamically gathered data at job performance type, one widget may point to one or more possible next widgets depending on dynamic evaluation of a conditional branch. For example, if a condition is evaluated to true, a widget that currently completed its interaction may point to the sequence number of one next widget, and if the condition is evaluated to be false, to another next widget. These expressions may be expressed through special types of interaction widgets such as a Conditional Action widget described in this disclosure.

Figure 5:
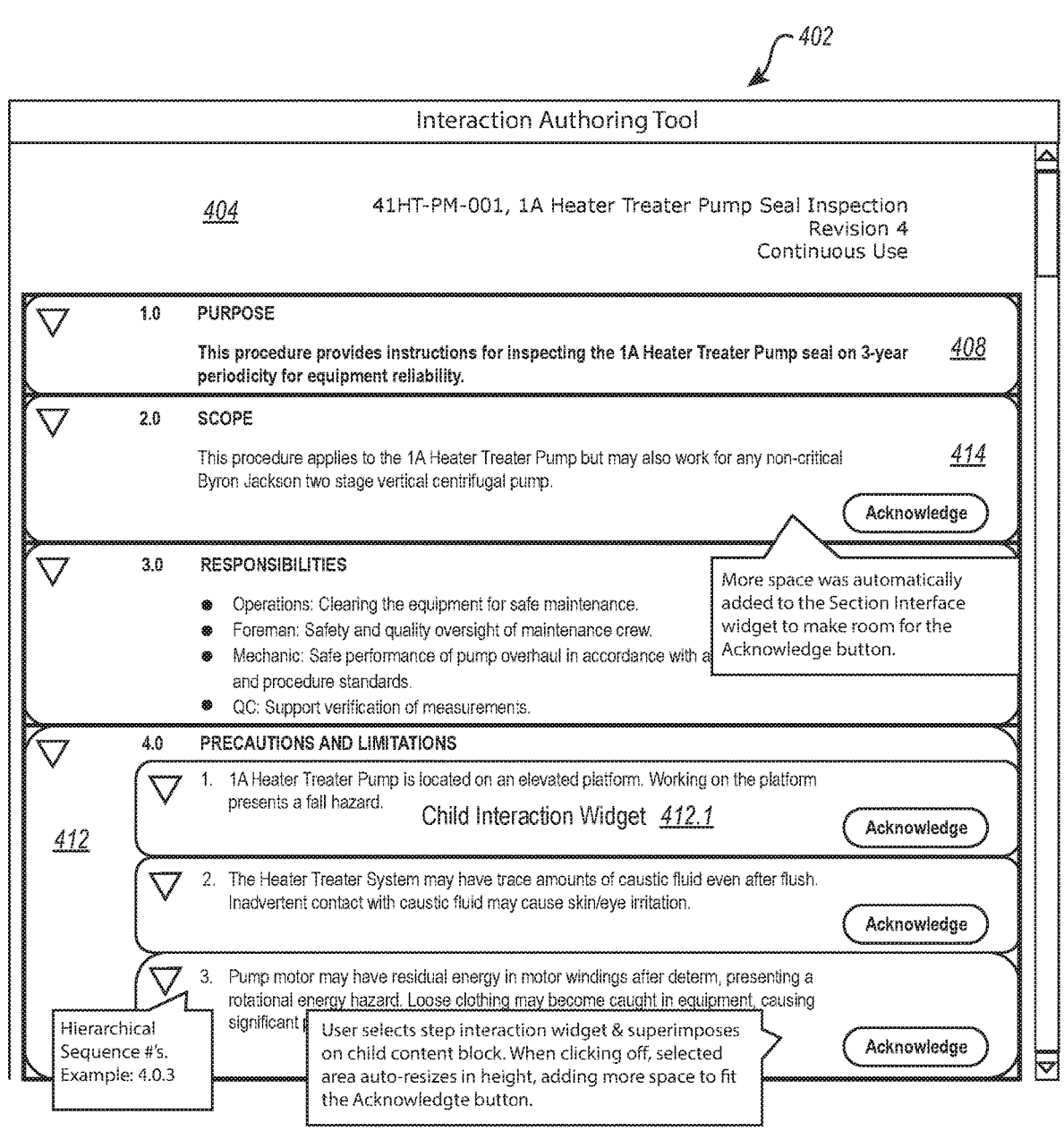
FIG. 5 shows the same digitized document as FIG. 4, with more superimposed and linked interaction widgets, where one of the interaction widgets contains child interaction widgets (or interaction sub-widgets) that correspond to instruction steps within the content blocks contained by the parent widget and with more space being added, dynamically, to the displayed digitized document to accommodate space for the Acknowledgment related interactions of some superimposed interaction widgets.

FIG. 5 shows the same digitized document 404 as FIG. 4, with more superimposed and linked interaction widgets, where one of the interaction widgets contains child interaction widgets, such as child interaction widget 412.1, (or interaction sub-widgets) that signify steps within the parent widget and with more space being added to the displayed digitized document to accommodate space for the Acknowledgment related interactions needed for some of the superimposed interaction widgets configured to require acknowledgment. Note that the metadata for an interaction sub-widget, may not be required to contain the snagged image or the content contained within said sub-widget, since the parent widget already contains said content as part of its metadata and the position of sub-widget may be stored relative to the position of its containing parent widget.

As shown in FIG. 5, the "Purpose" section is encapsulated by an interface widget 408 as also shown by FIG. 4 and explained earlier. Explaining further, the Section interface widget 414 associated with the content block in the section titled "Scope" was configured to require acknowledgment of consideration/performance at job performance time, and since there was not enough space to insert an "Acknowledge" button (as a means for enforcing the acknowledgment at job performance time), in between the sections titled "Scope" and "Responsibilities" in the original displayed digitized document 404 within the Section interface widget 414 associated to the "Scope", more space was added (refer to FIG. 1, step 108 and the explanation of the step provided earlier). Furthermore, the sequence numbers (signified by the Sequence->Current and attribute shown in FIG. 4) associated with the interface widgets, in this case, corresponds to the numbering of the sections/sub-sections of the digitized document. Accordingly, in this case, the Previous and Next widget references for each widget corresponds to the previous and next section's numbering. Furthermore, as demonstrated in FIG. 5, the interaction Section widget 412 associated with the fourth section of the displayed digitized document, titled "PRECAUTIONS & LIMITATIONS", contains interaction sub-widgets corresponding to each step of said section. These sub-widgets have hierarchical sequence numbers such as "4.1", "4.2", assigned based on the sequence number of their parent widget.

Once the interaction designer has contained all the desired content (or sub-content) blocks through corresponding interaction widgets (or sub-widgets) and finished the configuration and static or dynamic and conditional sequencing of the widgets, information associated with all the widgets is converted to structured metadata and saved as IIDM (or other appropriate data) as illustrated in FIG. 1 steps 112 and 113. The information includes, but is not limited to, the superimposed/overlaid position of the graphical widgets with respect to the displayed digitized document, a snagged image corresponding to the content block of the digitized document that is contained by each widget (note that this may not be needed for interaction sub-widgets as noted earlier), all the original content of the corresponding content block contained by the widget if available and needed, and all of the widget properties, conditional and sequencing information and other attributes. Also, a copy of the last displayed version of the displayed digitized document is saved with the metadata.

Yet, in another embodiment of the disclosure, generally, a set of interaction widgets are provided to correspond, more specifically, to the sections within typical procedure/instructions, including but not limited to, Purpose, Scope, Responsibilities, Precautions and Limitations, Prerequisites, Parts and Materials, Instructions, References, and Attachments or a General Content widget that may contain any content block. Alternatively, or in conjunction with such specialized widgets associated with each typical section or content block, a general-purpose Section widget (as shown in FIG. 5), with a "Section Name" as one of its configurable attributes, may be provided that may be generically mapped to any section within the digitized document by the interaction designer and its "Section Name" attribute can be set to the title of the mapped section.

For example, if the Section widget is mapped to a section of the digitized document titled "Purpose", then the "Section Name" attribute of the widget may be set to "Purpose" by the interaction designer (or as discussed later through automation). Furthermore, another set of widgets (or sub-widgets) may be pre-configured to associate to the typical subsections under the Instructions section, including but not limited to, Step or Action Step, Time Dependent Step, Continuous Action Step, Note, Caution, Warning, Conditional Action, Branch (or Go to), Component Verification, Reference (or Refer to), Bulleted list, Figure, Table, Critical Step, and Hold/Inspection Point or Independent Verification. These typed widgets are examples of widgets that may be available in the displayed "Interaction Widget Palette" referred to in FIG. 1, step 102.2.

In some embodiments, a general Section widget with general and further configurable interaction properties is mapped to a section of a content block when no explicit keyword association is configured to match with a title of what is assumed to be a section of the content block. One of the attributes of the widget can capture the title, if any, of the section.

In some embodiments, a General Container or Content widget with general and further configurable interaction properties is mapped to a content block when no explicit keyword association is configured and matched with the title of a content block. One of the attributes of such a widget is designed to capture the title, if any, of the content block.

Yet, in another embodiment of the disclosure, generally, an interaction widget associated with some content type may contain child interaction widgets and those child interaction widgets may contain other child interaction widgets to any level of depth. One approach to capturing the order of widget navigation is to associate hierarchical sequence numbers to widgets. For example, if the interaction widget associated with an Instruction section of the digitized document has a sequence number of 5, the first child Step interaction widget corresponding to the first step of the Instruction widget will have a sequence number of 5.1, the second child Step widget will have a sequence number of 5.2 and so on. This scheme for sequence number can accommodate any level of widget parent/child relationship. The content type associated with a parent interaction widget will be marked completed automatically when all its relevant child interaction widgets are marked completed.

Yet, in another embodiment of the disclosure, generally, the set of available widgets, their interaction and interface behavior and their association with the sections and content blocks of procedure/instructions may be configuration-driven. One way to approach the configuration mechanism is to introduce a superset widget that provides a superset of capabilities, for all possible interactions, and properties to turn those capabilities on/off, say with defaults set to off, and then to allow the user to define any number of named custom widgets each with a relevant subset of those capabilities, by turning on each desired capability through configuration. For example, the user may define a widget named "Caution" widget, using an instance of said superset widget, and only turn on the "acknowledgment required" and placekeeping interaction capabilities of the associated instance of superset widget through an XML-based configuration mechanism.

Yet, in another embodiment of the disclosure, generally, a dynamic Table of Contents (TOC) of all the widgets superimposed/overlaid on top of the digitized document is represented on a display, in the order defined by the links across the widgets, through their sequence numbers, or other means of sequencing, and with each entry in the TOC uniquely representing a superimposed/overlaid widget, in a manner that the TOC can be used to navigate to a particular widget in the display that contains the content blocks of the digitized document through hyperlinks or a similar manner both within IAT 402 and IIP.

Yet, in another embodiment of the disclosure, generally, the interaction designer may define named views and then associate each superimposed/overlaid widget to one or more of said named views through an attribute provided on the widget for defining such associations such that, at job performance time, the user of the IPT 702 is able to switch to different views, where each selected view only displays the content of the widgets associated to said view.

Yet, in another embodiment of the disclosure, generally, the interaction designer can divide the digitized document into two parts: 1) Front Matter (usually containing sections such as Purpose, Scope, Responsibilities, Precautions and Limitations, and Prerequisites) vs Body (usually containing the procedure or instructions). And then require the person performing the job, at job performance time, to acknowledge the Front Matter before he/she may proceed to the Body. Alternatively, the IAT 402 may provide a widget designed to contain multiple sections of the digitized document, say Section widget, in this case containing all the sections of the Front Matter, and turn on the acknowledgment interaction for that widget and link it to the first widget of the Body.

Yet, in another embodiment of the disclosure, generally, when the digitized document is expressed in a rich content type, by extracting and storing the original contents of the content block contained by a widget with the associated widget metadata, the procedure/instructions and the user-computer interaction widgets associated to its sections may be also presented with a different form factor on any device such as a smart phone or smart glasses at job performance time, without relying/using the digitized document in the background, and by first determining the position of the next widget with the smallest sequence number on the device display and then displaying the content relative to the position of the containing widget on the display, then based on widget sequence numbers, selecting a next widget and determining its position relative to the first widget and then displaying its content relative to the position of its containing widget, until all content blocks are displayed relative to the position of their containing widgets on the display. Then, placing the first widget on the display of a computational device to signify the current content block under performance and provide placekeeping and other interaction through the display of the widgets as work progresses at job performance time.

Yet, in another embodiment of the disclosure, generally, the widgets associated with some select sections of the procedure/instructions may be superimposed/overlaid on top of the saved digitized documents and the performance of some other select sections, including but not limited to steps within select instructions, maybe transferred to another device, such as a smart glass, without relying/using the digitized document in the background.

Yet, in one embodiment of this disclosure, generally, a widget associated with a Conditional Action may support branching based on an IF/WHEN [condition], in order to link the widget to another specific widget thus causing automatic navigation to the specific widget at job performance time. The condition may be expressed as a binary or a series of binary questions, for example with Yes/No answers, linked through logical operators such as AND/OR/NOT or EITHER/OR, or any number of logical operators and conditions. A Conditional Action Widget may reference data that was previously entered by a user to make a determination of whether a widget and its content should be displayed at all when a prior completed widget pointing to it is marked as completed or Not Applicable (N/A).

Figure 6:
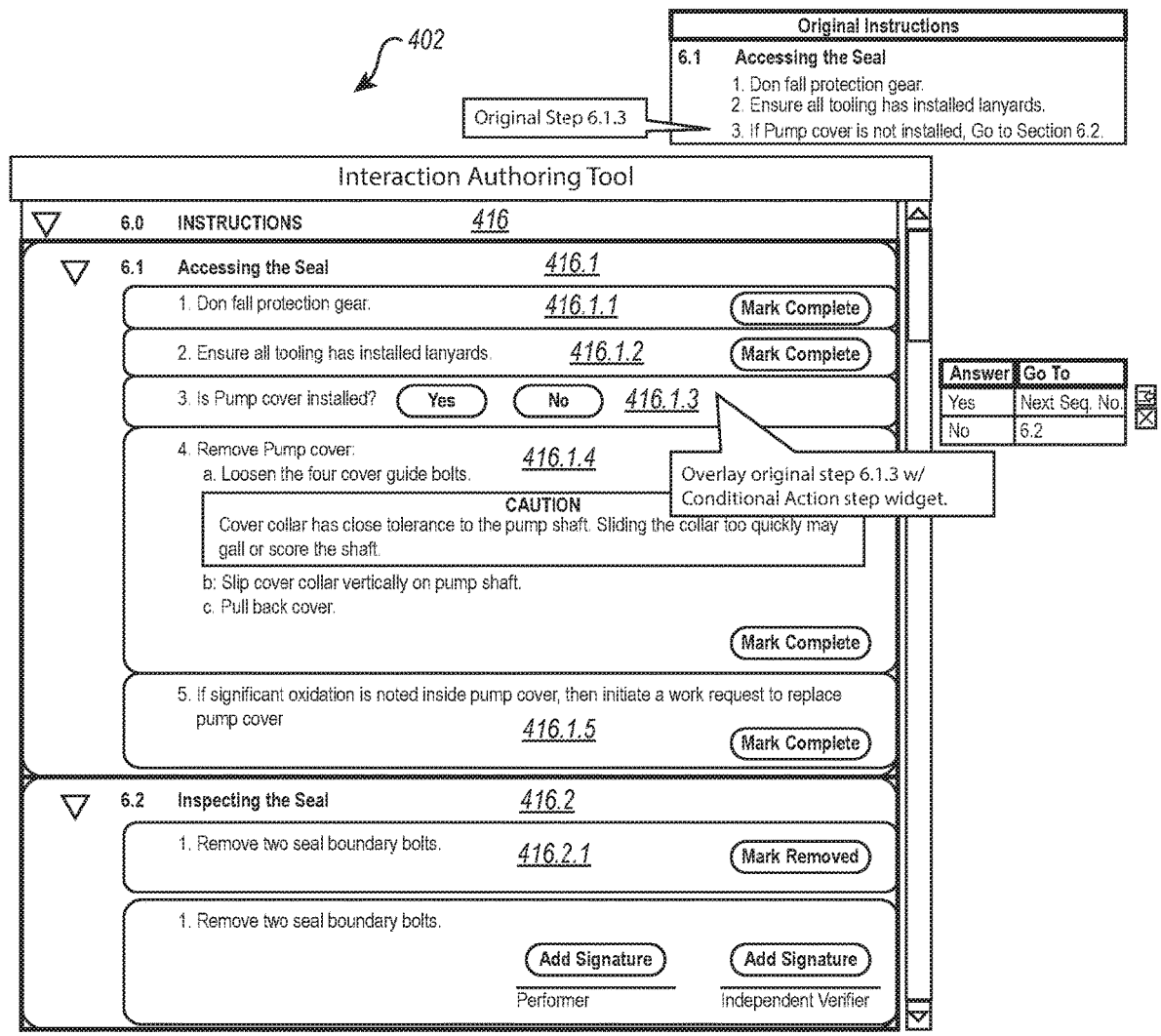
FIG. 6 shows the use of a Conditional Action step widget, within IAT, to define automatic branching and navigation to the next interaction widget based on dynamic user input later provided at job performance time within the Interaction Performance Tool (IPT).

FIG. 6 shows an example of the use of a Conditional Action step widget 416.1.3, within one embodiment of IAT 402, to define automatic branching and navigation to the next interaction widget based on dynamic user input later provided at job performance time within the IPT 702. As shown, the interaction widget 416 associated with the "INSTRUCTIONS" section of the displayed digitized document, contains a Step interaction sub-widget 416.1 associated to the first step of the instructions section. The Step interaction sub-widget 416.1, itself, contains five interaction Step sub-widgets 416.1.1, 416.1.2, 416.1.3, 416.1.4, and 416.1.5. The sub-widget 416.1.3 associated to the third sub-step (with sequence number 6.1.3) is a Conditional Action step interaction widget overlaid on top of the corresponding content block of the displayed digitized document. The original instruction in the digitized document read "If Pump cover is not installed, Go To Section 6.2", however, because the Conditional Action widget was overlaid (vs superimposed), the original content block is covered by the widget, and the interaction designer configures the Conditional Action widget to read: "Is Pump cover installed?", and provides two buttons corresponding to two possible binary answers of "Yes" or "No" and in this case configures the "Yes" answer to go to the widget 416.1.4 with the next sequence number and "No" to branch to a widget 416.2 with sequence number 6.2. At job performance time, as shown in FIG. 7 and explained later in this disclosure, if the user presses the button label with "Yes", the IPT 702 displays/activates the widget 416.1.4 associated with the next sequence number, 6.1.4, and if the "No" is selected, the IPT 702 branches and displays/activates the widget 416.2 with 6.2 (and, in this case, also its first child widget 416.2.1 at sequence number 6.2.1.

Yet, in one embodiment of this disclosure, generally, a widget associated to a Repeat section is provided to support two basic forms of repeating: 1) by embedding a Conditional Action widget that causes automatic navigation through branching to a prior step/widget, 2) by being configured to repeat a specified number of times. In any case, at job performance time, the user will be able to see the original performance results and its associated data for each step without obscuring the use of the steps for the repeat, for example, through multiple tabs, where each tab is associated to an iteration of the repeat with the current iteration in the first tab. When a Repeat section is complete, IPT 702 either navigates the user back to the origin or to the next sequential widget, depending on the rules configured through IAT 402 or the structured metadata.

Yet, in another embodiment of the disclosure, generally, an interaction widget, for example one associated with a simple Action Step, may be configured to enforce time requirements. These requirements may include, but are not limited to, minimum time, maximum time, or a time range for the performance of the widget. At job performance time, the user is provided with a clock/stopwatch that he/she may manually start/stop/reset, where the clock changes visual state when the time requirement is met, which then the user may mark the step as completed.

Yet, in one embodiment of this disclosure, generally, an interaction widget, for example one associated with a simple Action Step, may be configured to require and enforce Concurrent Verification (CV), where two users performing a step/section must be physically present together. In this case, both workers will perform the step together and sign off, through initials or digital signature sub-widgets, after the performance of the step/section is completed and before they are allowed to proceed to the next step/section of the procedure/instructions. IPT 702 may visually render a CV step/section distinctly to ensure that the main user and the concurrent verifier are both present before performing the step. Similarly, an interaction widget may be configured to require and enforce Independent Verification (IV), where the only difference is that the verifier does not have to be present at the time the step/section is being performed. When an interaction widget configured as IV is marked as complete, the IPT 702 will not yet progress to the next step, instead it sends a notification, maybe through an embedded Notification sub-widget, to the independent verifier with a link to the IV widget requiring verification, and only then will IPT 702 navigate the user to the widget associated with the next step/section.

Yet, another embodiment of the disclosure relates, generally, to IAT 402 providing procedure/instructions authoring capabilities through a palette 406 of interaction widgets used for authoring new procedures/instructions, containing widgets types corresponding to the widgets types used for superimposing/overlaying on top of the existing written procedure/instructions, except that these procedure/instructions authoring widgets provide means for authoring and creating new content blocks. Widget instances from this palette may be connected and combined, through sequence numbering, with the widgets used for superimposing interaction on top of existing content blocks.

Yet, in one embodiment of this disclosure, generally, any interaction widget may be added to a set of reusable widget templates, where reusable widgets templates are grouped by their type, for example reusable widget templates of type Caution, and made available within the IAT 402 so they may be combined with other interaction widgets. When a widget is made reusable, the sequence number of the corresponding widget template becomes dynamic and, in some such embodiments, it is only assigned when an instance of the widget template is connected or embedded in other interaction widgets based on the sequence number of the connected or containing widget and if the widget template contains child widgets, the hierarchical sequence number of the child widgets are adapted to the parent widget.

Yet, another embodiment of the disclosure relates, generally, to the bidirectional integration of data and automatic dispatch of application functions from other applications, such as enterprise asset or work management systems, to/from an existing written procedure/instructions, instructional manual or fillable form, in PDF or any digitized binary format (the digitized document), driven by the selection of a software service interface with typed input/outputs, including but not limited to, standards-based Web Services, whereby selecting an input or output of a service operation, based on its type, an interface widget, configured to be associated to that type, is provided within the IAT 402 that may be overlaid or superimposed on any part of the content block of the digitized document, where said any part of content block may be encapsulated within an existing interaction widget. IAT 402 saves the interface widget together with information regarding the selected software service and its input/outputs as structured metadata in IIDM. At job performance time, when an interface widget associated with the input of a service is activated, the user will be prompted to provide the input within the area covered by said input interface widget and once all inputs to a service are provided, the service will be either invoked automatically, or its execution may be tied to a user trigger event such as the press of a button through a button widget. When a widget associated with a service output is activated, at job performance time, the area of the content block covered by the interface widget associated with that output will be automatically populated with the associated output data from the execution of the service. In the case which both input(s) and output(s) of a service are associated with content blocks through multiple interface widgets, the service may be executed, only after all input data is entered by the user. If an interface widget is contained within an interaction widget, it will activate only when the containing interaction widget displays.

There are a number of differences between this method of integration and other prior art methods. One major difference between this method and other previous methods is that the previous methods either allow the user to place an input data widget anywhere on the display or to relate the input data widget to a fixed, inflexible location of an underlying digitized document. Instead, in this method, an input widget, used to take user input at performance time, or an output widget, used to populate a portion of the display with data from other systems, is placed relative to the position of a containing interaction widget, or any container widget used to encapsulate and contain a content block of the digitized document, and regardless of the digitized document and without requiring the digitized document at performance time. Another notable difference is that the inputs and outputs of a software service, such as a standards-based Web Service (e.g., WSDL/SOAP or REST), are implicitly associated to input/output widgets at design time. Furthermore, at performance time the associated software services are automatically executed resulting in direct integration with other software applications through their business logic layer, as opposed to simply saving the data in a database only to be integrated later. The method of containing the input/output interface widgets within other linked interaction/container widgets supports new capabilities that not only does not require the inflexible association of the input/output widget to a hardcoded location of the digitized document, but also provides means for interactive computer-guided navigation at job performance time.

Yet, another embodiment of the disclosure relates, generally, to a Data Interface Widget for simple data entry by the user, without being tied to the inputs/outputs of a software service. The Data Interface widget may be superimposed/overlaid on any part of a content block that is already contained within any other widget and the data entered through such widget is made available throughout the interactive instruction/procedure/form to be referenced by all widgets with sequence numbers greater than the sequence number of the Data Interface Widget or its containing widget. Furthermore, the users of IAT 402 and IPT 702 may enter constants in interface widgets to support computation (ex min/max values). The location of a Data Interface Widget is saved relative to its containing widget just as with other interaction or interface sub-widgets.

Figure 2:
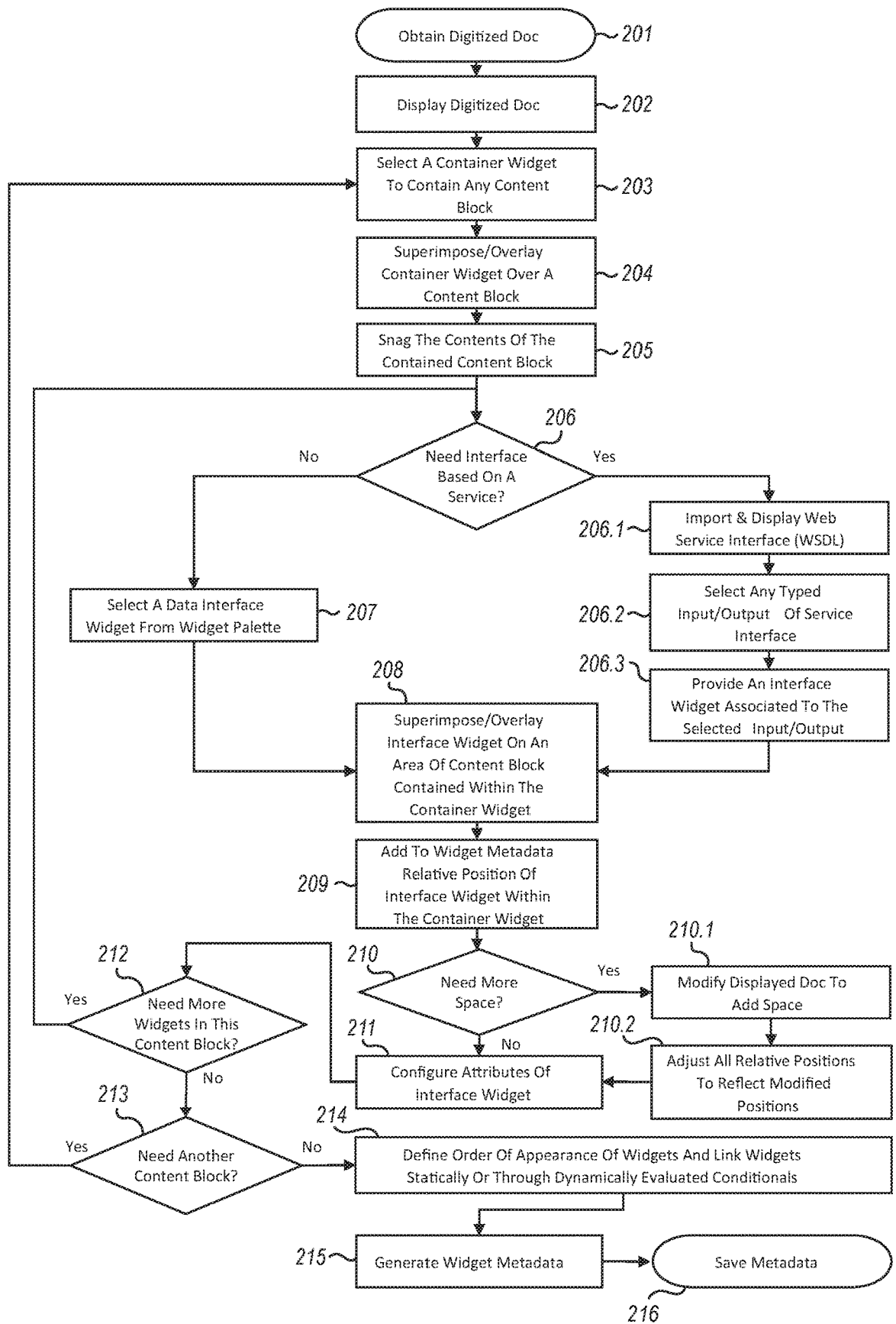
FIG. 2 shows a flowchart of an embodiment of a method to define application and data integration through superimpose/overlay of interface widgets on top of content blocks, or portions thereof, of any digitized written procedure/instructions, instructional manual and fillable forms, resulting in structured metadata definitions.

FIG. 2 illustrates a flowchart for one embodiment of the method for defining application and data integration through superimpose/overlay of interface widgets on top of content blocks, or portions thereof, of written procedure/instructions, instructional manuals and/or fillable forms, resulting in structured metadata definitions saved as IIDM. FIG. 2 illustrates obtaining a digitized document at step 201 and displaying the digitized document at step 202. While FIG. 2, step 203, refers to a general "container widget" that encapsulates and contains (through a snagged image or capturing the contents of) a content block (step 205) of the displayed digitized document such that it can be used independent from the digitized document at job performance time, an "interface widget" described in earlier embodiments of this disclosure qualifies as a container widget and thus the process described in FIG. 1 and FIG. 2 may be combined to address both requirements for user-computer interaction and application integration in a single process. FIG. 2, step 206 accommodates creating interface widgets both based on software services (see steps 206.1, 206.2, and 206.3) as described earlier or creating or selecting interface widgets (see step 207), referred to as simple Data Interface widgets, that do not require mapping to inputs/outputs of a software service but are meant to capture dynamic user input data, during job performance, and make such data available to other widgets for reference, for example, in the evaluation of dynamic conditionals and for dynamically branching to the next widget. Regardless of the type of interface widget, in FIG. 2 steps 208 and 209, the interaction designer superimposes/overlays the interface widget over an area of the content block contained within a container/interaction widget and the relative position of the interface widget with respect to the container/interaction widget is added to the widget metadata.

As illustrated in FIG. 2, step 210, if the interface widget needs to occupy a space that is larger than the space provided by the specific area of the displayed digitized document that is being contained by its containing container/interface widget, the digitized document may be modified (see step 210.1 and 210.2) to add more space following a process as explained earlier for FIG. 1, step 108. Attributes of an interface widget are configured at step 211. FIG. 2, step 212 illustrates how a container/interaction widget may contain one or more child/sub widgets. One can modify the process illustrated in FIG. 2 to allow interface widgets to contain other interface widgets or to allow container/interaction widgets to contain other container/interaction widgets. As illustrated at step 213, portions of the process can be repeated for other content blocks. The process illustrated in FIG. 2 is concluded in steps 214, 215 and 216 where widgets are sequenced, and all widget information and attributes are translated into IIDM and saved.

Yet, in one embodiment of this disclosure, generally, a configurable Notification interface widget is provided to cause the automatic publication of a notification to the person performing the job and/or to other users and applications through the dispatch of a software service associated to said widget. The Notification widget may be configured to evaluate dynamic input/output data. When another person is notified, the notification message provides a link such that the person may launch an instance of the interactive procedure/instructions/form in an instance of the IPT 702 and automatically navigate to the same place where the notification was originated.

Yet, in one embodiment of this disclosure, generally, a configurable Equipment interface widget is provided to integrate events and data from specific Internet of Things (IoT) enabled equipment or to cause such equipment to perform a specific action at job performance time. The Equipment widget can be configured to connect to a specific equipment through its unique identifier, which may be a URL, in order to invoke specific API's on the processor of that equipment.

One of ordinary skill in the related art, may easily combine the processes of FIG. 1 and FIG. 2 to create a single IIDM metadata containing definitions of both interface widgets and interaction widgets to provide interactions and well as integrations at job performance time for a single digitized document that represents written procedure/instructions, instructional manuals and/or fillable forms. This may be accomplished, through one embodiment of this disclosure, generally, using interaction widgets defined through the process illustrated in FIG. 1 as "container widgets" referred to in Step 203 of FIG. 2. This can be simply accomplished by replacing Steps 201, 202, 203, 204 and 205 in FIG. 2, with Steps 101 through 110 of FIG. 1. Such that, once all interface widgets are defined, interaction widgets may be added inside of the interface widgets. There are other ways of combining the processes illustrated in FIG. 1 & FIG. 2. For example, by inserting steps 206 through 212 of FIG. 2, in between steps 109 and 110 of FIG. 1 such that the creation of interface widgets and interaction widgets may be intermingled. Furthermore, one can create variations of the steps in FIG. 1 and/or FIG. 2, or any flowchart that is derived by combining the processes in FIG. 1 and FIG. 2 into a single process resulting in a single IIDM that can be applied to the digitized document. For example, one variation may allow some interface widgets to be placed inside of other interface widgets or their sub-widgets.

In one or more embodiment of this disclosure, at job performance time, the IPT 702 interprets the saved IIDM metadata resulting from the process in FIG. 1 and/or FIG. 2 or any new process resulting from combining the two processes, as mentioned earlier, and applying the combination to the digitized document. In one embodiment, the IPT 702 may display the content blocks encapsulated by interaction/container widgets through any of the following means, or other appropriate means: 1) by displaying a copy of the saved version of the digitized document in a scrolled window and providing placekeeping and interactions/integrations by superimposing/overlaying the first interaction/container widget corresponding to the first contained content block of the digitized document, based on the associated coordinates, and sequencing and other information saved in the metadata, and then when current widget is marked as completed, displaying the next interaction/container widget in the sequence and so on and so forth until the last widget is displayed and its interactions are performed. 2) By displaying all the snagged images of the content blocks associated with each widget in the sequence the widgets are linked and relative to the simulated placement of the first widget (without the display of the widget itself) on an empty computer display/window and then the simulated placement of other widgets relative to the first widget and based on their sequence number, without displaying or relying on the saved digitized document, and then superimposing the first widget over the already displayed content block contained by the first widget to activate the widget and signify the initial content block under performance, and when said initial content block is marked as complete, to display/activate the next relevant widget to signify the next content block to be performed, and repeat the process until all relevant widgets are displayed and marked as completed. 3) Similar to 2 above but, instead of displaying the image, to display the original content contained by the widget optionally in different form factors appropriate for the display on different computing devices. Regardless of the means of display, at job performance time, the widgets displayed based on the structured metadata are used to provide computer-guidance and application integration and to dynamically advance the user to the next section of the procedure/instructions relevant to the job.

Figure 3:
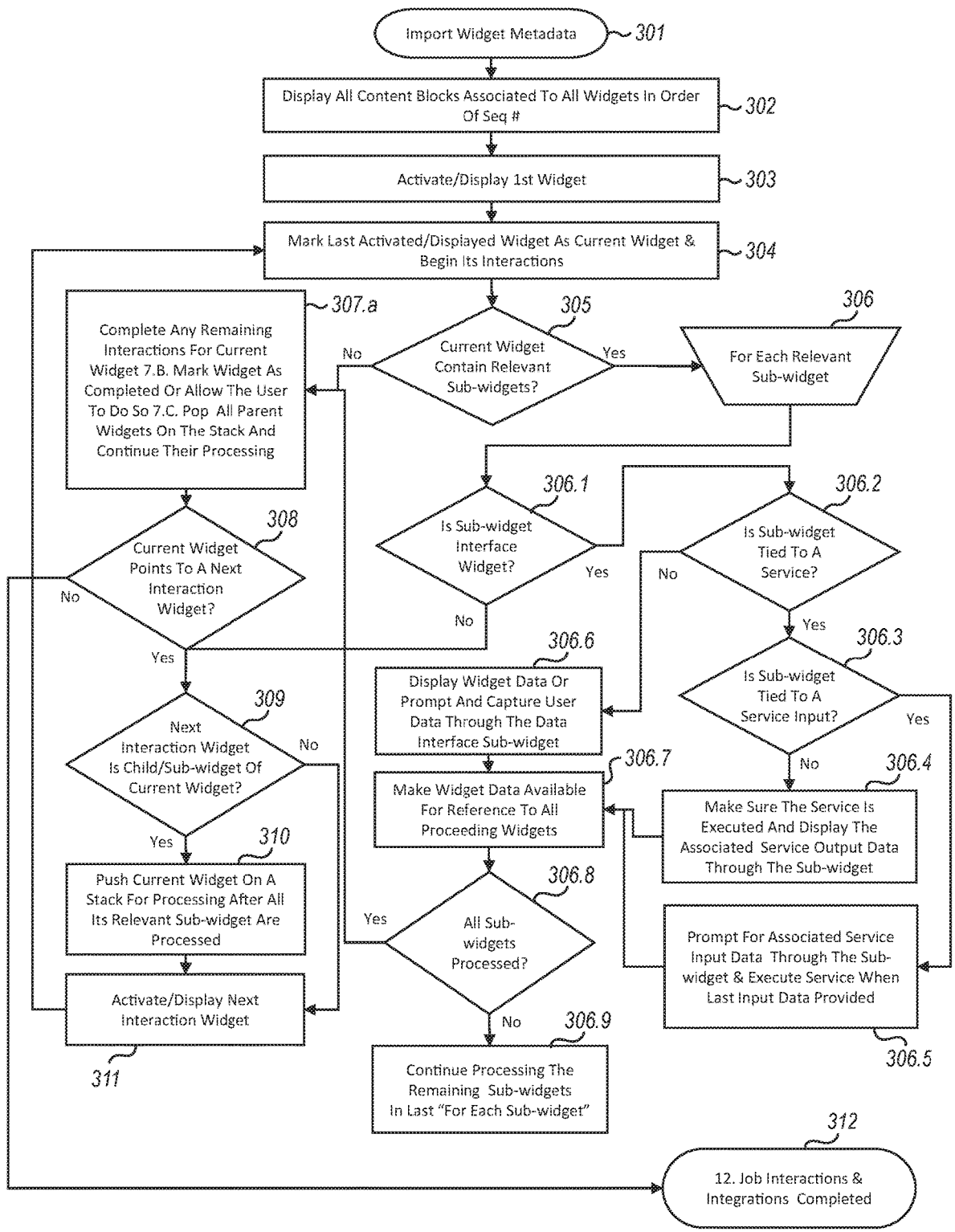
FIG. 3 shows a flowchart of a method to provide/perform, at job performance time, user-computer interaction and computer-aided navigation as well as application and data integration through superimpose/overlay of interaction and interface widgets on top of content blocks of any digitized written procedure/instructions and fillable forms based on structured metadata definitions.

Yet, in another embodiment of this disclosure, FIG. 3 relates to a flowchart of a method to perform, user-computer interaction and computer-aided navigation as well as application and data integration at job performance time, based on the structured metadata IIDM resulting from combining the processes described in FIG. 1 and FIG. 2 and applying the combined process to the digitized document. In step 301 of FIG. 3, said resulting IIDM is imported and loaded into computer memory into data structures (that may include hash maps, linked lists, arrays or a combination of other conventional data structures) that are optimized for the implementation of the process in FIG. 3. FIG. 3, step 302, relates to displaying all the content blocks contained by all the interface/container widgets, in the order of their sequence number, starting from the smallest sequence number using either of the means numbered "2)" or "3)" for displaying content blocks encapsulated by interaction/container widgets, described in the above paragraph without requiring a copy of the digitized document. After all the content blocks are displayed in step 302, moving to step 303 of FIG. 3, the widget associated to the first displayed content block is activated/displayed around said content block and marked as the "Current widget" (see step 304) to provide a placekeeping function, process all it sub-widgets (see steps 305, 306, 306.1, 306.2, 306.3, 306.4, 306.5, 306.6, 306.7, 306.8, 306.9) if any, and also to enforce its defined interactions. Once the first content block is considered/performed by the user and its enforced interactions completed, the widget may be marked as completed automatically (see step 307), for example, upon interaction requiring acknowledgment of the content block by the user, or manually by the user when automatically marking as completed is not an option. After the completion of the first widget, which includes the processing of its relevant sub-widgets described in step 306 and the sub-steps thereof of FIG. 3, if any, IIP determines the next interface widget to be activated/displayed, if any, and marks the widget as "Current widget" (see steps 308, 309, 310, and 311).

If the first or any subsequent widget that was marked as the "Current widget", through performing step 304 of FIG. 3, does not have any child/sub-widgets relevant to the job scenario being performed as determined in step 305 of FIG. 3, where such determination may be made based on conditionally linked widgets that may result in skipping the performance of all or some of its sub-widgets, if any, by branching to another non-sequential widget, said "Current widget" completes all its interactions and is marked as completed through step 307, when said widget points to a next interaction widget (again such next widget may be determined conditionally), as determined in step 308 of FIG. 3, the next widget is displayed and activated, according to step 311 of FIG. 3, and the processing of that widget will loop back to step 304 of FIG. 3 thus said next interaction widget will be marked as the "Current widget".

If the first or any subsequent widget that was marked as the "Current widget", through performing step 304 of FIG. 3, does have one or more relevant child/sub-widgets, where such relevance may be determined through dynamic conditional branching based on job data gathered so far through the process, as determined in step 305 of FIG. 3, all the sub-widgets of the "Current widget" and, in the case where any sub-widget is yet another interaction widget, all of its sub-widgets, and so on and so forth will be processed by the embodiment of IPT 702 according to the step 306 of FIG. 3 together with its sub-steps. One can modify the process described in FIG. 3, to allow processing of interface widgets that contain other interface widgets, to any level of depth.

In step 306.1 according to one embodiment of the disclosure illustrated in FIG. 3, each sub-widget of the "Current widget" is either an interface widget or an interaction widget. Each relevant sub-widget of the "Current widget", is processed through the sub-steps of step 306. For each relevant next sub-widget being processed, when the sub-widget is not an interface widget, as determined in step 306.1, it is implied that the sub-widget is an interaction widget, in which case, the processing continues through step 309, to step 310 of FIG. 3, where the "Current widget" that is the parent interaction widget of the sub-widget is placed on a Stack data structure so its processing continues after its sub-widget is processed. Then, through step 311, the interaction sub-widget is activated/displayed and processing loops back to step 304, where the sub-widget becomes the "Current widget". Using this process, interaction sub-widgets, within other interaction sub-widgets, and so on and so forth to any level of depth may be processed. The parent widget of an interaction sub-widget is pushed on a processing "Stack", such that it can be 'popped' after its interaction sub-widget completes its processing through step 307.c of FIG. 3, to continue its processing as the "Current widget". The use of a Stack data structure accommodates embedded interaction sub-widgets to any level of depth. To keep the process flowchart in FIG. 3 easy to understand, many conventional details associated with error-handling or special cases have been omitted. One with ordinary skill in the art will acknowledge that such detail can be addressed through conventional data structures and processes common in the relevant art.

Referring once again to FIG. 3, when a relevant sub-widget is an interface widget, as determined in step 306.1, if the definition of that sub-widget is not tied to a software service, as determined in step 306.2, the sub-widget is a Data Interface widget that based on its defined type is used to either gathered data by prompting the user or used for displaying and will be processed through step 306.6. If the sub-widget is tied to a software service, as determined in step 306.2, the processing of the interface sub-widget moves to step 306.3 where the widget is determined to be either tied to the input(s) or output(s) of a software service. If it is tied to the output(s), through step 306.4, the associated software service is executed, if it was not already executed, and the associated service output data is displayed through the sub-widget within the area of the content block occupied by the sub-widget. Otherwise, if the sub-widget is tied to input(s) of the associated service, in step 306.5, the user is prompted for the referenced input data through the associated sub-widget and the service is executed when the last input data is gathered through an interface sub-widget. All the steps 306.4, 306.5, and 306.6 will go through step 306.7 of FIG. 3, where all input and/or output data gathered will be made available to be referenced and accessed by all proceeding widgets and sub-widgets and processing moves to step 306.8, where the processing continues to the next sub-widget, if any, through step 306, and where all sub-widgets of the "Current widget" are processed, processing move to step 307 where all remaining interactions of the "Current widget" are completed and the widget is marked as complete and if there are any parent widgets on the Stack, each parent widget is 'popped' in order and its processing is resumed as the "Current Widget". The process illustrated in FIG. 3, does not address processing of interface widgets as sub-widgets of other interface widgets. One with ordinary skill in the art acknowledges that this process may be easily modified to accommodate such processing.

If the first or any subsequent widget that was marked as the "Current widget" performing its interactions does not have any child/sub-widgets as determined in step 305 of FIG. 3, and it does not point to a next interaction widget, as determined in step 308 of FIG. 3, there are no more widgets to be processed and thus all relevant interactions and integrations associated with the job are already performed, where processing moves to step 312 which signifies the end of processing of IIDM by this embodiment of IPT 702 according to FIG. 3.

FIG. 7 shows an example of an embodiment of the Interaction Performance Tool (IPT) 702, performing user-computer interaction, computer-guided navigation and placekeeping as shown (and partially defined) in FIG. 6. As shown in FIG. 7, the performance of steps 6.1 and 6.2 were already confirmed by the user through their associated Action Step interaction widgets and thus they are marked as "Completed" by the IPT. Furthermore, the user has selected the button labeled "No" when the overlaid widget 416.1.3 associated with step 6.1.3 was activated/displayed, and therefore, the widgets 416.1.4 and 416.1.5 associated with steps 6.1.4 and 6.1.5 were automatically marked as "N/A" and the configured text supplied for the "N/A" state of the corresponding widgets and the widget 416.2.1 with sequence number 6.2.1, corresponding to section 6.2.1 of the document is automatically activated/displayed and navigated to, as the next relevant step that needs performance and thus performed by the user.

Yet, in another embodiment of the disclosure, generally, any of the widgets, regardless of type, provide a set of general interaction capabilities at job performance time through IPT 702 some of which may be configured through the TAT 402 or the structured metadata associated with interaction widgets and their sub-widgets. These capabilities may include, but are not limited to: a) the ability to add comments to each widget, through say a Comment sub-widget that can be placed and relocated to any area within said interaction widget by the user, b) the ability for a user to provide feedback/change-request on a content-block associated with an interaction widget, for example through a Feedback sub-widget similar to the Comment sub-widget, such that the procedure/instructions writer may consider the feedback at a later time, c) the ability to flag any interaction widget to be added/removed to/from bookmarks for easy navigation, d) the ability to expand or collapse all or some of the interaction widgets, including their child interaction widgets, e) the ability to capture media (ex. video, pictures, sound) through Media sub-widgets that can be associated with any interaction widget, f) the ability for the user to overwrite the sequence in which the computer navigation is designed to follow based on the sequence numbers associated with the interaction widgets or conditional branching, under certain circumstances, however requiring justification in the form of enforced Comment/Feedback and initials of the user, g) provide the ability to jump to the current step or section of the interactive digitized document with one click, h) provide the ability for the user to see progress status of the completed steps against the total required steps local to interaction widgets associated with an instructions widget and its child widgets as well as overall progress with respect to the entire procedure/instructions/form. Note that using IAT 402, the person defining the interactions through widgets can specify what percentage or how many units of work is associated with each widget relative to the overall work and for sub-widgets relative to the parent widget, i) the ability to enforce the navigation of the widgets associated with the numbered sections and steps of instruction, and the sub-widgets associated with bulleted sections in an interactive procedure/instructions in order, such that sequential performance is enforced and a later step/widget is not allowed to be marked complete (or N/A if not applicable) until the prerequisite step/widget is marked complete, or out of sequence, such that the associated steps/widgets can be performed in any order and marked as complete (or N/A if not applicable, based on the selected widget properties designated through IAT 402 or expressed in the structured metadata associated with a procedure/instructions/form, j) the ability to automatically mark a parent widget complete when all its child widgets are dispositioned or marked as complete, k) the ability to automatically provide centralized menus or Table of Contents for all widgets and sub-widgets associated with the sections and sub-sections as well as for the references and figures such that the user may directly navigate to any of them through the menus, 1) the ability to support full-text search as well as search/view by section type such as all Cautions or all the interface widgets used for data entry, through which search/view the user may directly navigate to the content of the widgets associated to the search results, m) the ability for the user to pause the performance of a section/step such that the associated widget timer freezes and no step can be dispositioned and the display becomes read only until resumed, n) ability to zoom in/out, pan and annotate figures/diagrams, o) to support four different states for each widget and sub-widget: Not-started, Under-performance, Completed or N/A (Not-applicable), p) to highlight Critical steps distinctly, q) to provide an indexed view for each widget/sub-widget type, such as Caution, Comment, Feedback, Media or other widgets and sub-widgets associated to each content-block, so it can be reviewed separately, and provide easy navigation to the interaction widget against which the comment was entered and thus to the content-block contained by that interaction widget.

Yet, another embodiment of the disclosure relates, generally, to capturing and aggregating information about the dynamic, user-computer interaction during job performance to provide job performance monitoring, statistics and analytics. Examples of such data includes, but is not limited to, location of job performance through device GPS coordinates, the elapsed time between the completion of each step of instruction, and other dynamic data resulting from user-computer interaction throughout job performance.

Yet, another embodiment of the disclosure relates, generally, to automatic generation of IIDM by programmatically reading a stream of digitized written procedure/instructions through a computer processor and into a computer memory, for example in PDF format, and parsing and analyzing the contents and dispatching subroutines to programmatically superimpose widget metadata corresponding to typical procedure/instructions labels encountered where the label to widget associations may be configuration-driven. For example, when a Caution section is encountered in the stream, a rectangular Caution interface widget is automatically created with its dimensions corresponding to the area needed to sufficiently contain the content type of the associated Caution section, and a sequence number that is automatically assigned considering the sequence number of the last automatically generated interface widget then saved within the IIDM.

Yet, another embodiment of the disclosure relates, generally, to adding palette(s) of widgets to IAT 402, designed for encapsulating commands that may drive one or more computerized machine(s) capable of carrying out a complex series of actions, where each command drives one or more action(s), and relates to a step of an instruction encapsulated with a widget from said additional palette(s). With the practice of this embodiment, instead of a user performing one or more of the steps within an instruction, one or more computerized machine(s) may be automatically driven to perform said steps(s).

Yet, another embodiment of the disclosure relates, generally, to automatic adjustment of the structured metadata in the IIDM associated with an original digitized document, based on a revised version of the original digitized document, by programmatically comparing the revised version with the original and identifying the sections deleted and added to/from the original document and then adjusting the IIDM to delete the widgets associated with the deleted sections and to re-compute the coordinates of the remaining widgets in IIDM to account for the new coordinates of the corresponding widgets.

Further, the methods illustrated above may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RANI and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system designed for having one or more computers configured to implement a method to define user-computer interaction and computer guided navigation for content blocks of a written procedure or instructions, instructional manual or fillable form, with definitions used at job performance time to provide said interaction and navigation, a method comprising:
   obtaining a digital version of a digitized document, the digitized document comprising a written procedure or instructions, an instructional manual or a fillable form;
   providing a set of typed dynamic graphical user interface interaction widgets on an interactive computer user interface, where each widget is used to encapsulate and contain a content block, being a logical unit of content or a collection of such, from the digitized document, and where each widget is designed to provide specific user-computer interactions and computer guided navigation at a job performance time;

superimposing or overlaying, in the user interface, a first widget from said set of interaction widgets on top of or over a content block of said digitized document thereby encapsulating and containing said content block by capturing contents of the content block;

defining an order of appearance and activation of each interaction widget relative to other widgets at said job performance time;

configuring attributes of the widgets;

saving resulting widget information, comprising information about the content block contained within each widget together with its attributes, on a computer-readable storage medium for execution or interpretation by one or more processors when work associated with an encapsulated content block of the digitized document is being performed by an entity; and wherein an interaction widget associated to a Step content block is placed inside an interaction widget associated to an Instruction section, as its child sub-widget, and linked with other widgets including other Step widgets, with each Step widget having a series of properties and sub-widgets to support one or more of the following:

declaring the order of execution of Steps, at job performance time, as sequential, based on widget sequence numbers, or in an arbitrary order;

indicating that completion of a step requires confirmation by the user and to provide a property or a sub-widget that may be placed inside a Step widget, for enforcing confirmation;

a time-dependent step by automatically providing a timer starting from when a step was entered, at job performance time, and automatically enforcing a time dependency of a content block while providing the ability to pause and resume when applicable;

indicating if the completion of a Step, at job performance time, requires a workers initials and providing a sub-widget for the initials that may be used, by placing it inside a Step widget;

indicating if a Step is a Critical Step so that it may be rendered in a visually distinct way at job performance time; or indicating if a Step requires two users to be physically present together to implement concurrent verification before a step may be marked as completed, in which case an initial or signature sub-widget is added to a Step widget.

2. The method of claim 1, further comprising:

wherein providing a set of typed dynamic graphical user interface interaction widgets comprises providing a set of resizable interaction widgets corresponding to one or more of sections, subsections, steps, or any content block representing one or more logical units of the digitized document;

receiving user input selecting the widget corresponding to a section, subsection, step, or content block of the digitized document, from the set of widgets;

receiving user input placing the selected widget on the user interface and resizing and moving it to surround and to contain said section, subsection, step, or content block;

adding to a widget data structure for the widget, at least one of the following: i) coordinates of the widget relative to the displayed digitized document such that widgets may be superimposed or overlaid over a copy of the displayed digitized document at job performance time, ii) a snagged image of a content block contained by the widget, such that at job performance time, content blocks contained by widgets can be displayed irrespective of the position of the widgets relative to a copy of the displayed digitized document and without using the digitized document in the background, or iii) contents being contained by the widget corresponding to the contained content block of the displayed digitized document, when the digitized document is of rich-content type, such that the widget data structure may be used later, to represent the corresponding content block of the digitized document in a different display form factor, for different computer devices without relying-on or displaying the underlying digitized document and by displaying the contents associated with the containing widgets based on the position of the containing widgets relative to each other and then overlaying or superimposing the widgets;

setting attributes and properties of the widget as it relates to look and feel and interaction choices relevant to the contained content block;

defining the order of appearance of widgets, in order to support computer-guided navigation of the widgets at job performance time, by providing means to sequence and link one widget to another, either statically or based on dynamically evaluated expressed conditions and adding such sequencing information to the widget data structures;

saving, on a persistent computer data store, a copy of the displayed digitized document together with at least one of the following: i) the position of the overlaid or superimposed widgets relative to the displayed digitized document, ii) the snagged image of the content of the content block contained by each widget, iii) content of the content block contained by each widget, iv) look & feel properties of each widget, v) interaction properties of each widget, or vi) sequencing information of each widget.

3. The method of claim 1, wherein the set of widgets or their user-computer interaction properties comprise titles or headings corresponding to at least one of: Purpose, Scope, Responsibilities, Precautions and Limitations, Prerequisites, Parts and Materials, Instructions, References, or Attachments with one or more keywords being associated to each title and the corresponding widget type;

wherein when an Instruction section is included, a subset of widgets types are configured to associate to subsection titles under the Instructions section, including at least one of, Step, Action Step, Time Dependent Step, Continuous Action Step, Note, Caution, Warning, Conditional Action, Branch, Component Verification, Reference, Bulleted list, Figure, Table, Critical Step, Hold, or Inspection Point, with one or more keywords being associated to each title and corresponding widget type.

4. The method of claim 1, further comprising displaying a dynamic Table of Contents (TOC) on a portion of a device display representing all the widgets superimposed or overlaid on top of the digitized document in the order defined by the widget relationships or links or sequence numbers and with each entry in the TOC uniquely representing a superimposed or overlaid widget in a manner that the TOC can be used to navigate to a particular widget on a display containing the digitized document.

5. The method of claim 1, wherein each superimposed or overlaid widget is associated with one or more named and indexed views, through a widget attribute, such that at job performance time, when the user selects one of those views, only the content of the widgets associated to said view are displayed with a TOC containing only the widgets associated to said view with navigation to the content block of the associated widgets.

6. The method of claim 1, wherein general configurable properties or sub-widgets contained within another widget are provided across all widgets to support specific interaction behavior at job performance time including at least one of:
- to support typed data entry interface widgets corresponding to basic data types, complex data entry widgets corresponding to tables, widgets for images, drawings, sound, video and other form media, such that all said widgets may be placed inside of interaction widgets, or other data entry interface widgets;
- to view feedback associated to any select content block of the digitized document contained by a widget, or feedback which were provided at job performance time by persons performing a job;
- to specify what percentage or how many units of work is associated with each widget relative to the overall work and for each sub-widget relative to the parent widget or the overall work such that at job performance time, the user is enabled to see what percentage of work associated to widgets and sub-widgets is performed in relation to the total work associated to a parent widget or overall work;
- to require acknowledgment at job performance time, through a sub-widget or property, that the content block contained within a widget is read and conformed with, before the person performing the procedure or instructions can continue to the next content block contained by the next widget; or
- to cause a widget to appear collapsed or expanded, by default, at job performance time.

7. The method of claim 1, wherein a widget, including its content block and attributes except for the sequence designator attribute or an attribute used for sequencing, is added to a set of reusable widget templates, grouped by widget type, and a widget instantiated from a reusable widget template is linked with other widgets taking on its sequence attribute in the context of other linked widgets; and, where the reusable widget instance has child widgets, the child widgets' hierarchical sequence designators adapted to its parent widget's sequence attribute.

8. The method of claim 1, further comprising, providing a set of procedure or instructions authoring interaction widgets having widget types that correspond to the widget types used for superimposing or overlaying interactions on top of existing content blocks, and with the same interaction capabilities as their corresponding types, wherein the procedure or instructions authoring interaction widgets are configured to be used for authoring or defining new content blocks and are configured to be linked to an existing widget.

9. The method of claim 3, wherein a widget associated with a Conditional Action content block is configured, through at least one of properties or sub-widgets, to express one or more logical conditions based on dynamic input data, where all conditions are configured to be dynamically evaluated at job performance time and result in automatic navigation to widgets associated with different sections and content blocks of the procedure or instructions, with configuration defining one or more of:

multiple conditions linked through logical operators;
each condition to define the next widget to navigate to when the condition evaluates to true or a different next widget when it evaluates to false;
declaring the widget as a Continuous Action, when the expressed condition must follow the form: if at any time [condition], then [Action].

10. The method of claim 3, further comprising one or more of the following:
- a widget associated with a Branch content block is configured to cause a transition to a procedure or instructions step other than a next step in a current procedure or instructions or to another digitized document containing other procedure or instructions without returning to current sections of the digitized document with the widget associated with the Branch content block, at job performance time;
- a widget associated with a Reference content block is configured to cause a transition to perform actions from another document or a transition to a section in another set of written procedures or instructions and then return to a current digitized document to complete a task or activity, at job performance time;
- a widget associated with a Component Verification content block is configured to provide interaction means for integration to equipment sensors, barcodes, RFID or similar technologies, or the ability to scan and analyze a component or a tool's tag or ID for purposes of verifying that a correct equipment or tool is being worked-on or used for a procedure or instructions at hand;
- a widget associated with a Signature or Initials content block is configured to provide means for a user to electronically sign a corresponding section;
- a widget associated with a Figure content block is configured to include a figure and may be configured to display the figure or to collapse a section containing the figure such that it can be expanded on demand by a user, at job performance time;
- a widget associated with a Table content block is configured to include sub-widgets designed for data-entry or dynamic data population of a section of the procedure or instructions at job performance time;
- a widget associated with a Hold Point content block is configured to enforce and support obtaining a signature of another qualified user for verification without requiring a verifier to be present, at job performance time to mark the step as complete;
- a widget associated with a Bulleted list content block is configured to provide interaction means to perform a contained bulleted instructions in any order while keeping track with a current bullet, having marked bullets that were already performed and enforcing performance of all bullets; or
- a General Content widget, with configurable interaction capabilities, is associated with a content block of the digitized document to capture the content of an associated section and to provide relevant interaction through configuration of its attributes.

11. The method of claim 3, further comprising:
a Repeat interaction widget is associated with a portion of instructions requiring repeating a series of steps based on dynamically evaluated conditions or a fixed number of iterations where said Repeat widget automatically provides all required navigation, computation, branching and placekeeping interactions as well as a clear view of all iterations performed;

a widget associated with a Step is configured to contain nested sections and Steps and their corresponding widgets.

12. The method of claim 1, further comprising:
programmatically reading the digitized document into computer memory;
programmatically analyzing the contents of the digitized document;
programmatically matching content blocks with associated widgets;
programmatically superimposing or overlaying interaction widgets associated with sections and content blocks of the digitized document;
programmatically sequencing the widgets;
programmatically inferring other attributes; and
programmatically saving the resulting structured metadata such that the structured metadata can be displayed for further interaction design or validation.

13. In a computing system designed for having one or more computers configured to implement a method to dynamically integrate data or cause the dispatch of software functions, from external software applications, in the context of select areas of the content blocks of digitized written procedure or instructions, an instructional manual or a fillable form, or within widgets containing said content blocks, a method comprising:
obtaining a digital version of a digitized document, the digitized document comprising a written procedure or instructions, instructional manual or fillable form;
implicitly or through explicit configuration, associating each possible type of input or output data of software services to a typed interface widget;
providing a user interface element in a user interface for the selection of a specific input or output of a software service available where said software service may be used as a means to pass data or bring data or dispatch a function to or from an external application;
providing a user interface element in the user interface to superimpose or overlay the widget associated to said input or output on top of an area of a content block of said digitized document or within other widgets that are designed to encapsulate and contain such content block by capturing contents of the content block;
providing a user interface element in the user interface to define the order of appearance and activation of each widget relative to other widgets at job performance time;
providing a user interface element in the user interface to configure the attributes of the widgets;
providing a user interface element in the user interface to save the resulting widget information, including at least one of: information about a content block contained within each widget, a widgets position relative to an associated content block or relative to a containing widget, or a widgets attributes, on a computer-readable storage medium, for execution or interpretation by one or more hardware processors to automatically gather dynamic data for the inputs of the software service through its associated interface widget superimposed or overlaid on selected areas of a said content block, to automatically invoke the service, and to populate widgets associated with the service outputs with output data of the service effectively over the selected areas of a said content block of the digitized document at job performance time; and
providing a user interface element to place an interaction widget associated to a Step content block inside an interaction widget associated to an Instruction section, as its child sub-widget, and linked with other widgets including other Step widgets, with each Step widget having a series of properties and sub-widgets to support one or more of the following:
declaring the order of execution of Steps, at job performance time, as sequential, based on widget sequence numbers, or in an arbitrary order;
indicating that completion of a step requires confirmation by the user and to provide a property or a sub-widget that may be placed inside a Step widget, for enforcing confirmation;
a time-dependent step by automatically providing a timer starting from when a step was entered, at job performance time, and automatically enforcing a time dependency of a content block while providing the ability to pause and resume when applicable;
indicating if the completion of a Step, at job performance time, requires a workers initials and providing a sub-widget for the initials that may be used, by placing it inside a Step widget;
indicating if a Step is a Critical Step so that it may be rendered in a visually distinct way at job performance time; or
indicating if a Step requires two users to be physically present together to implement concurrent verification before a step may be marked as completed, in which case an initial or signature sub-widget is added to a Step widget.

14. The method of claim 13, further comprising:
displaying the digitized document in a graphical user interface;
providing access to graphical user interface input or output definitions of a software service for describing the inputs or outputs of a service including data types, optional defaults, or restrictions for each input or output field;
providing user interface elements to allow a user to select a service input or output field and then automatically display a data widget implicitly, or explicitly through configuration, associated with said input or output field and allowing the user to place the widget on an area of the display over a content block of the digitized document being displayed, or over another widget containing said content block, and accommodating the resizing and relocation of the widget by the user to cause the widget to either overlay or to superimpose over the selected said content block or its containing widget, for capturing dynamic user input data to be automatically mapped to the inputs of an associated software service, or for populating a specific area of said content block with dynamic application data from a service output, at job performance time, after the automatic execution of the associated service;
when an interface widget needs to occupy space that is larger than space provided by boundaries of a contained content type, modifying the digitized document to add the required space, extending said widget to occupy the added space, readjusting coordinates of other widgets that are in a location of the display below the extended widget to compensate for the added space and displaying the modified version instead of the original digitized document on the display;
providing a user interface element to allow the user to place an interface widget inside of another widget, where the other widget may be used in order to contain or capture the contents of a content block of the digitized document;

adding to each interface widget metadata including coordinates of the widget relative to the displayed digitized document such that said widget may be superimposed or overlaid on top of the digitized document at job performance time;

when an interface widget is contained in another widget, adding to widget metadata the coordinates of the interface widget relative to the containing widget, such that at job performance time, the containing widget and its captured content block may be displayed first and then the interface widget can be displayed relative to the containing widget irrespective of the position of said interface widget relative to the digitized document;

providing a user interface element to allow the user to set the look & feel properties or change the associated default type of the widget to a different widget;

storing and referencing within an interface widget, user defined constants with their default values;

defining the order of appearance, in order to support computer-guided navigation of the widgets at job performance time, by providing means to sequence and link one widget to another, either statically or based on dynamically evaluated expressed conditions and adding such sequencing information to the widget data structures;

saving, on a persistent computer data store each widget's look & feel properties, other user attributes as well as similar metadata of contained and containing widgets and other metadata associated with the widgets, including: i) a copy of the displayed digitized document together with the position of overlaid or superimposed widgets relative to said digitized document or relative to its containing widget, ii) content of content blocks contained by each containing widget, in a structured format, for interpretation at job performance time.

15. The method of claim 14, wherein one or more of the following interface widget types is provided:

a Data Interface widget that is not tied to the inputs or outputs of software services and is used to collect input data dynamically and without invoking a service at job performance time and allow a user and the external application to reference dynamic data within other widgets in order to support conditional navigation and to perform computations;

an Equipment interface widget that integrates events and data from specific IoT enabled equipment or to cause such equipment to perform a specific action at job performance time;

a configurable Notification interface widget used to cause the automatic publication of a notification based on the evaluation of dynamic data to a person performing a job or to other applications through automatic dispatch of a software service associated to said widget.

16. In a computing system designed for having one or more computers configured to implement a method to perform automated software application integration, user-computer interactions, computer guided navigation or automation functionality for user or computerized machines performing a job, with said job relating to content blocks of a digitized document comprising at least one of written procedure or instructions, an instructional manual or a fillable form, with said content blocks being encapsulated within sequenced and linked widgets with specific interaction, integration and navigation behavior, and based on information contained in structured metadata, a method comprising:

loading structured metadata in application memory in a structure appropriate for execution or interpretation by various types of processors when a work associated with an encapsulated content block of a corresponding digitized document, the content block comprising captured contents of the digitized document, is being performed by a person, group of people or one or more computerized machines;

displaying the digitized document on a device display;

activating and performing interactions, automations and integrations of a first widget, associated with a first encapsulated content block of the digitized document being displayed, based on the structured metadata;

activating and performing interactions, automations and integrations of relevant sub-widgets;

determining a next widget that needs to be activated based on static or conditional information in the metadata that depends on dynamic data generated or gathered during performance of content blocks associated to widgets at job performance time;

performing interactions, automations and integrations of the next widget;

repeating the acts of determining a next widget performing interactions, automations and integrations of the next widget until a last activated widget is reached; and wherein an interaction widget associated to a Step content block is placed inside an interaction widget associated to an Instruction section, as its child sub-widget, and linked with other widgets including other Step widgets, with each Step widget having a series of properties and sub-widgets to support one or more of the following:

declaring the order of execution of Steps, at job performance time, as sequential, based on widget sequence numbers, or in an arbitrary order;

indicating that completion of a step requires confirmation by the user and to provide a property or a sub-widget that may be placed inside a Step widget, for enforcing confirmation;

a time-dependent step by automatically providing a timer starting from when a step was entered, at job performance time, and automatically enforcing a time dependency of a content block while providing the ability to pause and resume when applicable;

indicating if the completion of a Step, at job performance time, requires a workers initials and providing a sub-widget for the initials that may be used, by placing it inside a Step widget;

indicating if a Step is a Critical Step so that it may be rendered in a visually distinct way at job performance time; or indicating if a Step requires two users to be physically present together to implement concurrent verification before a step may be marked as completed, in which case an initial or signature sub-widget is added to a Step widget.

17. The method of claim 16, further comprising:

wherein displaying the digitized document on a device display comprises either displaying the digitized document in a graphical user interface, or without relying on the whole of the digitized document, displaying all content blocks associated with each widget on the device display by determining or assigning an appropriate location for a first widget, corresponding to a first content block and then determining locations of all the other linked widgets relative to the first or a previous widget or a containing widget and then displaying a content block contained within each widget inside a location determined for each widget;

displaying or activating the first widget associated with the first displayed content block by superimposing or overlaying it over the associated content block based on properties expressed in the widget metadata, and then proceeding to the display of a next widget in a similar fashion, after the interaction of the first widget is completed;

repeating the process until all superimposed or overlaid widgets, required for a job performance are displayed or a last section of the digitized document is reached and a last widget is displayed and associated interactions performed;

when displaying an interface widget, based on information in the widget metadata, either automatically invoking all software services whose outputs are associated with the widget and then populating or displaying the output data, resulting from the automatic invocation of the service, inside of the associated interface widget; or, prompting the user for input data, using an appropriate widget associated to a type of input and then transferring user supplied inputs to inputs of the associated service and invoking the service to perform a function on another application; and when displaying an interaction widget, and of its child widgets, performing user-computer interaction implied by a specific type of the interface widget and displaying any contained interface widgets, and then advancing to a next relevant linked widget based on information in the structured metadata and displaying a containing widget associated with a next section of procedure or instructions.

18. The method of claim 16, wherein real-time state, data and the statistics associated with the performance of a procedure or instructions based on the interactions and advancement through widgets is automatically recorded, calculated, inferred and reported; wherein such statistics include one or more of: real-time reporting of a current section or step of procedure or instructions, location of performance of a section based on GPS coordinates, start-time and completion time of each procedure or instructions section or step, or analytics based on aggregated statistics across all job instances associated with a procedure or instructions.

19. The method of claim 17, wherein widgets associated to some select sections of the procedure or instructions are superimposed or overlaid on top of the digitized document and the performance of some other select sections, including steps within select instructions, are transferred to another device.

* * * * *